United States Patent [19]
Pfeiffer

[11] Patent Number: 5,367,154
[45] Date of Patent: Nov. 22, 1994

[54] PHOTOSENSOR READOUT DETECTOR HAVING DYNAMIC RESET RATE

[75] Inventor: Carl G. Pfeiffer, Hermosa Beach, Calif.

[73] Assignee: Hughes Aircraft Company, Los Angeles, Calif.

[21] Appl. No.: 953,640

[22] Filed: Sep. 29, 1992

[51] Int. Cl.$^5$ .............................................. H01J 40/14
[52] U.S. Cl. .................................. 250/208.1; 327/91; 327/514
[58] Field of Search ............. 250/214 A, 208.1, 214 R; 307/311, 228, 354, 362, 364; 330/308, 277; 358/213.19

[56] References Cited

U.S. PATENT DOCUMENTS

| | | | |
|---|---|---|---|
| 3,914,623 | 10/1975 | Clancy | 307/228 |
| 4,868,667 | 9/1989 | Tani et al. | 358/213.19 |
| 4,929,913 | 5/1990 | Sato | 330/277 |
| 5,038,214 | 8/1991 | Miida | 358/213.19 |

Primary Examiner—David C. Nelms
Assistant Examiner—Que T. Le
Attorney, Agent, or Firm—Hugh P. Gortler; M. W. Sales; W. K. Denson-Low

[57] ABSTRACT

An integrating circuit (12) includes a capacitor (22) which charges at a rate proportional to the instantaneous amplitude of an input signal $V_{IN}$ generated by a photosensor (14) to produce an integrated output signal $V_{OUT}$. The input signal $V_{IN}$ is proportional to the photon rate upon the photosensor (14), which is the quantity of interest. The output signal $V_{OUT}$ is non-destructively oversampled at a rate which is much higher than the Nyquist rate of the input signal $V_{IN}$ to produce sample signals $V_{S1}$ which are differenced and later recombined to produce a replica of the output signal $V_{OUT}$. The capacitor (22) is discharged and the output signal $V_{OUT}$ thereby reset to zero whenever the amplitude of the output signal $V_{OUT}$ reaches a predetermined maximum value $V_{RESET}$. The output signal $V_{OUT}$ is thereby "folded" into a sawtooth waveform, which has a dynamic range of $V_{RESET}$ divided by a minimum value. The photon rates of large amplitude signals, which can cause several resets during the observation period, are later reconstructed by averaging the slopes of the sawtooth waveform. The photon rates of small amplitude signals are later reconstructed by summing the differenced outputs during a Nyquist sample interval. Anomalous sample signals $V_{S1}$ with very large amplitudes corresponding to short duration "gamma" events such as nuclear radiation are detected, deleted and replaced with sample signals having amplitudes interpolated from the amplitudes of adjacent sample signals.

21 Claims, 3 Drawing Sheets

PHOTOSENSOR READOUT DETECTOR HAVING DYNAMIC RESET RATE

BACKGROUND OF THE INVENTION

1. Field of the Invention

The present invention generally relates to the art of optoelectronic photosensors, and more specifically to a photosensor readout detector with increased dynamic range and immunity to anomalous high intensity signals.

2. Description of the Related Art

A photon-counting detector for a Long Wave Infrared (LWIR) or optical photosensor estimates the incident photon rate during sample intervals $\Delta t$ by generating a voltage proportional to the number of photons collected by the photosensor during $\Delta t$. This is performed by an integrating circuit including a capacitor which charges with a current proportional to the instantaneous photon rate. The capacitor is discharged and the output of the integrating circuit thereby reset to zero at the end of each sample interval, where $\Delta t$ is the reciprocal of the Nyquist frequency of the process being monitored. An example of such a readout is found in U.S. Pat. No. 4,929,913, entitled "GAAS FOCAL PLANE ARRAY READOUT", issued May 29, 1990 to R. Sato et al.

The conventional detector in which the capacitor is discharged at fixed time intervals is known as an "integrate-and-dump" readout, and suffers from several disadvantages. For example, the dynamic range of the readout must be designed to accommodate the largest anticipated signal, which implies either a limited dynamic range capability or high power requirement. Modifications for extending the dynamic range, such as gain switching or a split dynamic range photosensor are complicated and expensive to implement.

Another disadvantage is the switching noise which is generated each time the integrating capacitor is discharged. The readout is also sensitive to "gamma" events caused by natural and nuclear radiation, which create anomalous high intensity, short duration noise spikes in the photosensor signal. A very short gamma event can contaminate an entire integration sample, which can cause a significant reduction in signal-to-noise ratio (SNR) in a high gamma rate environment.

SUMMARY OF THE INVENTION

In a folded dynamic range readout detector and method embodying the present invention, an integrating circuit includes a capacitor which charges at a rate proportional to the instantaneous amplitude of an input signal generated by a photosensor to produce an integrated output signal. The input signal is proportional to the photon rate upon the photosensor, which is the quantity of interest. The output signal is non-destructively oversampled at a rate which is much higher than the Nyquist rate of the input signal to produce sample signals which are differenced and later recombined to produce a replica of the output signal.

The capacitor is discharged and the output signal thereby reset to zero whenever the amplitude of the output signal reaches a predetermined maximum value. The output signal is thereby "folded" into a sawtooth waveform. The photon rates of large amplitude signals, which can cause several resets during the observation period, are later reconstructed by averaging the slopes of the sawtooth waveform. The photon rates of small amplitude signals are later reconstructed by summing the differenced outputs during a Nyquist sample interval. Anomalous sample signals with very large amplitudes corresponding to short duration "gamma" events, such as nuclear radiation, are detected, deleted and replaced with sample signals having amplitudes interpolated from the amplitudes of adjacent sample signals.

Although the present integrating circuit arrangement is especially suited for a photosensor readout, it may be applied to other applications in which an input signal is required to be integrated, sampled and processed.

A feature of the invention is to cause the reset to occur at a fixed voltage, rather than at a fixed time as in the conventional arrangement. The voltage buildup is non-destructively oversampled at a high rate such that the photon rates can be reconstructed at the Nyquist frequency in a downstream signal processor. The present arrangement is referred to as a "folded dynamic range readout" because a high-photon-rate signal will induce a high reset rate, thereby causing the signal to be folded into a sawtooth waveform.

The present invention reduces the physical size of the detector required to achieve a given system dynamic range, thereby reducing the size and power consumption of the detector and associated components. The dynamic range is automatically maintained at a relatively low value, since the reset rate becomes faster when the signal intensity becomes large. The SNR of low-photon-rate signals is improved by eliminating the switching noise associated with detector reset.

Gamma event circumvention can be effectively accomplished with the high oversampling rate such that samples corresponding to gamma events can be identified and deleted. In addition, where the system includes a multiplexer for multiplexing the signals produced by a focal plane array including large number of photosensors, the high oversampling rate produces a net reduction in the system operating power requirement because the increased power required for oversampling is more than compensated by the reduction in power attributed to the lower dynamic range.

These and other features and advantages of the present invention will be apparent to those skilled in the art from the following detailed description, taken together with the accompanying drawings, in which like reference numerals refer to like parts.

DETAILED DESCRIPTION OF THE INVENTION

Figure 1:
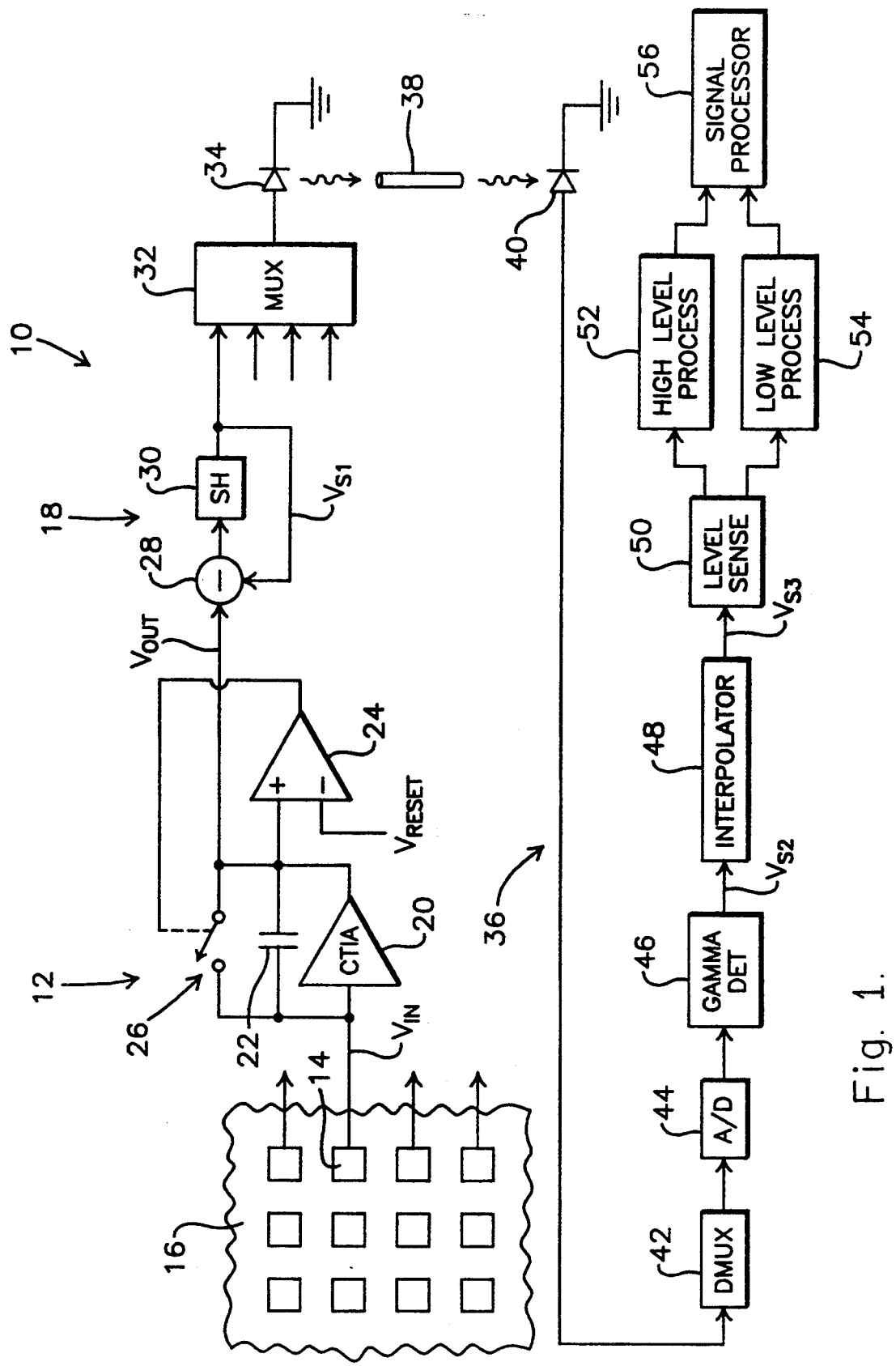
FIG. 1 is a simplified electronic schematic diagram illustrating a folded dynamic range readout detector for a photosensor embodying the present invention.

FIG. 1 illustrates a folded dynamic range readout detector embodying the present invention which is generally designated as 10, and includes an integrating circuit 12 which receives an input signal $V_{IN}$ from a unit photosensor 14 of a focal plane photosensor array 16. The output $V_{OUT}$ of the integrating circuit 12 is applied to a sampling circuit 18. Although not shown in the drawing, a similar integrating circuit and sampling circuit is provided for each unit photosensor of the array 16.

The integrating circuit 12 includes a capacitive transimpedance amplifier (CTIA) 20 having an integrating capacitor 22 connected as a feedback element between the input and output thereof. The photosensor 14 feeds the input signal $V_{IN}$ to the amplifier 20 which signal $V_{IN}$ is proportional to the instantaneous incident photon rate, or intensity of light incident on the photosensor 14. In accordance with the invention, the focal plane array 16 and associated optical imaging system (not shown) may be sensitive to light of any selected wavelength, such as LWIR and visible radiation.

The capacitor 22 in the feedback loop of the amplifier 20 charges at a rate which is proportional to the amplitude of the input signal $V_{IN}$. The output signal $V_{OUT}$ of the amplifier 20 is applied to an input of a comparator 24. A predetermined reset voltage $V_{RESET}$ is applied to another input of the comparator 24. When the output voltage $V_{OUT}$ has increased from zero (or other predetermined minimum value) to the reset voltage $V_{RESET}$, the comparator 24 generates an output signal which closes a normally open switch 26 which is connected across the capacitor 22. This causes the capacitor 22 to be shorted out and thereby discharged, such that the output voltage $V_{OUT}$ drops substantially instantaneously from the reset voltage $V_{RESET}$ to zero.

Figure 2A:
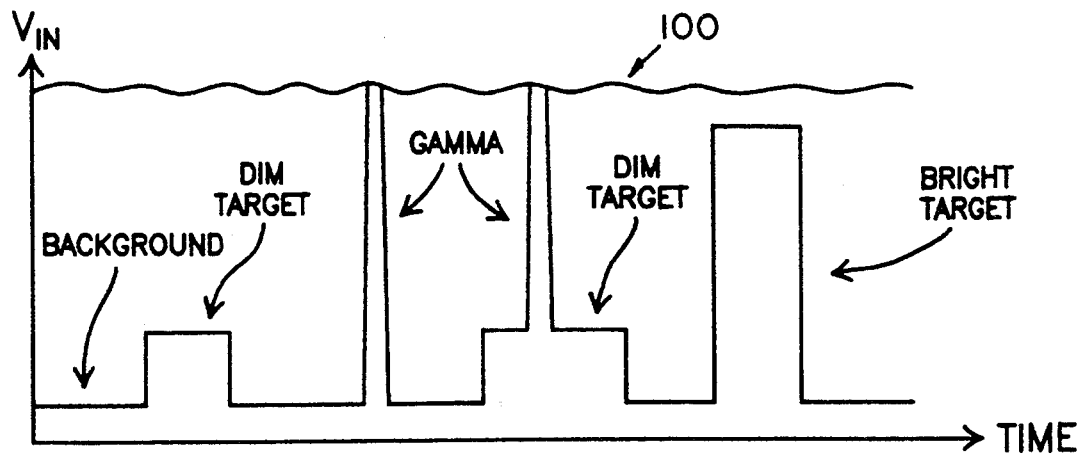
FIGS. 2a, 2b and 2c (collectively "FIG. 2") are upper, lower and center curves illustrating the operation of the present detector.
Figure 2B:
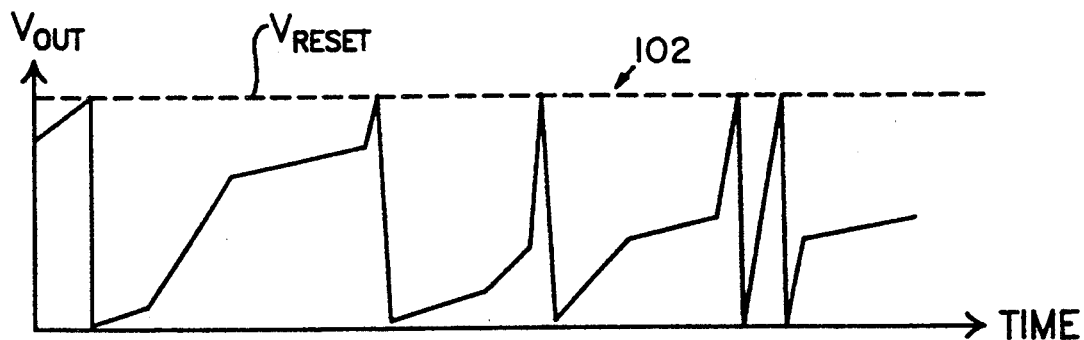
Figure 2C:
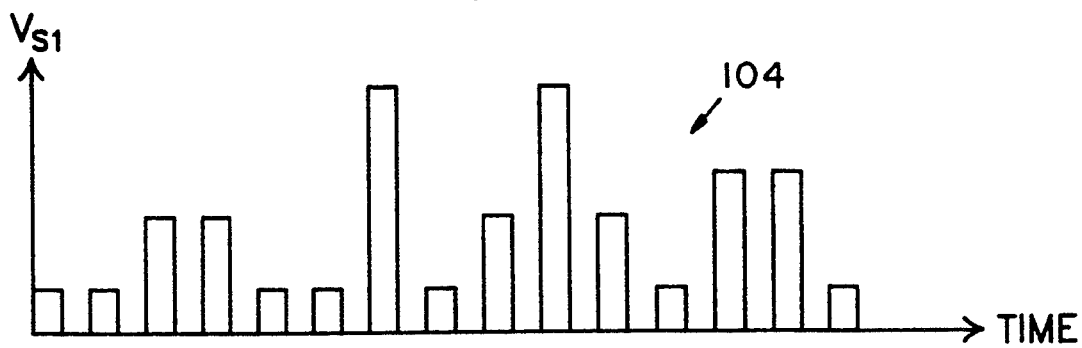

The operation of the integrating circuit 12 is illustrated in FIG. 2. The upper curve 100 illustrates the input signal $V_{IN}$ applied from the photosensor 14 to the integrating circuit 12. The upper curve 100 also represents the incident photon rate, or intensity of light incident on the photosensor 14, since it is proportional to the input signal $V_{IN}$. Illustrated in the drawing are the photon rates corresponding to background radiation, dim or low intensity targets, a bright or high intensity target and gamma events. A gamma event results in the generation of an anomalous high intensity, short duration noise spike in the input signal $V_{IN}$, and may be caused by natural or nuclear radiation, cosmic radiation, etc.

The center curve 102 in FIG. 2 illustrates the output signal $V_{OUT}$ of the CTIA amplifier 20. Due to the operation of the integrating circuit 12, the signal $V_{OUT}$ has a slope which is proportional to the incident photon rate, being almost horizontal in response to background radiation and almost vertical in response to gamma events. Due to the operation of the comparator 24 and switch 26, the signal $V_{OUT}$ is reset to zero whenever it has increased from zero to the reset voltage $V_{RESET}$. This has the effect of "folding" the signal $V_{OUT}$ into a sawtooth waveform.

Although the amplitude of the signal $V_{OUT}$ varies between the fixed values of zero and $V_{RESET}$, the time between resets of the signal $V_{OUT}$ varies continuously in accordance with the incident photon rate, and decreases as the photon rate increases. Thus, high photon rates will produce a large number of resets of the signal $V_{OUT}$ in a given length of time, and vice-versa.

The sampling circuit 18 includes a subtractor 28 having one input connected to receive the output signal $V_{OUT}$ from the amplifier 20 and thereby the integrating circuit 12, and an output connected to an input of a sample-and-hold (SH) circuit 30. The output of the SH circuit 30 is connected to another input of the subtractor 28.

The SH circuit 30 is designed to periodically oversample the output signal $V_{OUT}$ of the integrating circuit 12 at a rate which is much higher than the Nyquist rate of the input signal $V_{IN}$ generated by the photosensor 14. The Nyquist rate is the minimum rate at which a signal must be sampled without loss of information, and is well known in the art such as described in a textbook entitled "Digital Signal Processing", by A. Oppenheim et al, Prentice-Hall 1975, pp. 26–29. The Nyquist rate is approximately twice the highest frequency component in the signal being processed, in this case the input signal $V_{IN}$.

The SH circuit 30 samples and holds the output signal from the subtractor 28, and applies it as a sample signal $V_{S1}$ to an input of a multiplexer (MUX) 32 as well as to the input of the subtractor 28. At each sampling interval, the subtractor 28 produces an output equal to $(V_{S1} - V_{OUT})$. This signal is sampled by the SH circuit 30 as the new value of $V_{S1}$. In other words, the output signal $V_{OUT}$ is subtracted from the previous value of $V_{S1}$, and the difference therebetween becomes the new value of $V_{S1}$. The SH circuit 30 thereby produces the sample signals $V_{S1}$ as "first differences" of the samples of the output signal $V_{OUT}$. The sample signals $V_{S1}$ are illustrated in the lower curve 104 of FIG. 2. The amplitudes of the signals $V_{S1}$ are proportional to the slope of the output signal $V_{OUT}$ at the respective sampling times.

First differencing is known in the art per se such as described in the above referenced pages of the Oppenheim textbook. Although not described in detail, other sampling methods may be applied within the scope of the invention, such as second differencing (for background suppression) or delta modulation as described in the entirety of a textbook entitled "Delta Modulation Systems", by R. Steele, Pentech Press, London, 1975.

The SH circuit 30 samples the signal $V_{OUT}$ at an oversampling rate which is as high as possible in practical application. For example, the sampling interval may be 10 μs where the Nyquist sampling interval is 320 μs. This produces 32 samples per Nyquist interval, or an oversampling rate of 32. The maximum amplitude of the input signal $V_{IN}$ the detector 10 can accommodate is limited by the need to have at least two samples per reset interval in order to unambiguously determine the photon rate in accordance with the Nyquist criterion. The minimum amplitude of the signal $V_{IN}$ is limited by the SNR of the signal $V_{IN}$. The system dynamic range (SDR) is given as SDR = ½ (sampling rate/Nyquist rate) × RDR where RDR is the reset dynamic range and is given as RDR = (reset voltage/noise voltage)

A given value of SDR may be achieved using a CTIA amplifier 20 with a substantially smaller input voltage range than in a conventional system in which the integrating capacitor is reset at fixed time intervals. This is because the photon rate is sampled as being proportional to the slope of the output signal $V_{OUT}$, rather than to the amplitude thereof. The detector 10 has an automatic dynamic range adjustment, in that the reset rate increases as the photon rate and corresponding amplitude of the input signal $V_{IN}$ increase. For very small amplitude signals, no reset and accompanying capacitor switching noise will occur during observation of a target, producing a substantial increase in the SNR. This is important since high SNR is critical for detecting dim targets.

The multiplexer 32 has inputs connected to the outputs of the respective sampling circuits 18 associated with the respective photosensors of the array 16, and an output connected to an optoelectronic transmitter such as a laser diode 34. The function of the multiplexer 32 is to transmit the sample signals $V_{S1}$ from the sampling circuits 18 to a receiver section 36 in time sequenced or multiplexed form such that the signals can be processed sequentially. This may be accomplished by an optical link such as an optical fiber 38 which transmits the optical signals generated by the laser diode 34 to the receiver 36 via a photodiode 40.

The sample signals $V_{S1}$ received by the photodiode 40 are de-multiplexed by a de-multiplexer (DMUX) 42 and converted from analog to digital form by an analog-to-digital converter (A/D) 44. The signals $V_{S1}$ are then applied to a gamma detector 46 which monitors or tests the signals, and deletes those signals that are determined to correspond to gamma events. The gamma detector 46 produces output sample signals $V_{S2}$ as illustrated in the upper curve 106 of FIG. 3. Two sample signals $V_{S2}$ which were deleted by the circuit 46 are illustrated in broken line.

Various algorithms for determining which signals correspond to gamma events may be utilized in accordance with the present invention. For example, three successive signals $V_{S1}$ may be tested as a unit. If one of the signals has an amplitude which is greater than that of the other two signals by more than a predetermined amount, the large amplitude signal will be designated as corresponding to a gamma event and deleted. This method is practical since gamma events have short durations produce large amplitude noise spikes and do not span more than one sample signal $V_{S1}$.

Figure 3A:
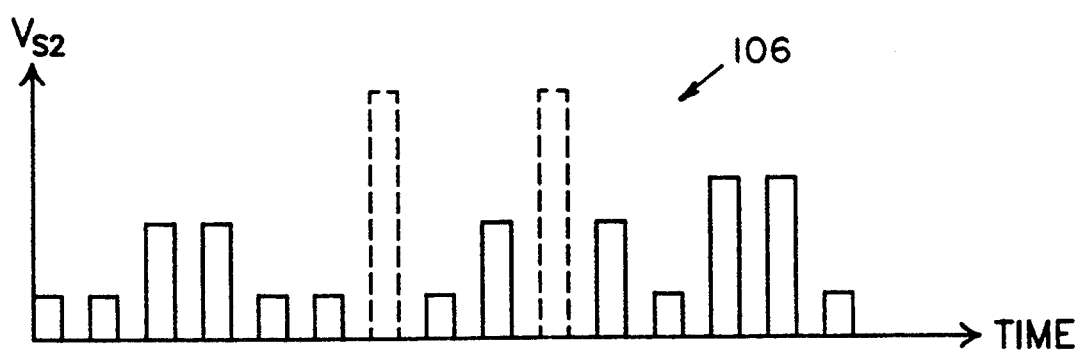
FIGS. 3a and 3b (collectively "FIG. 3") are upper and lower curves illustrating the operation of the present detector.
Figure 3B:
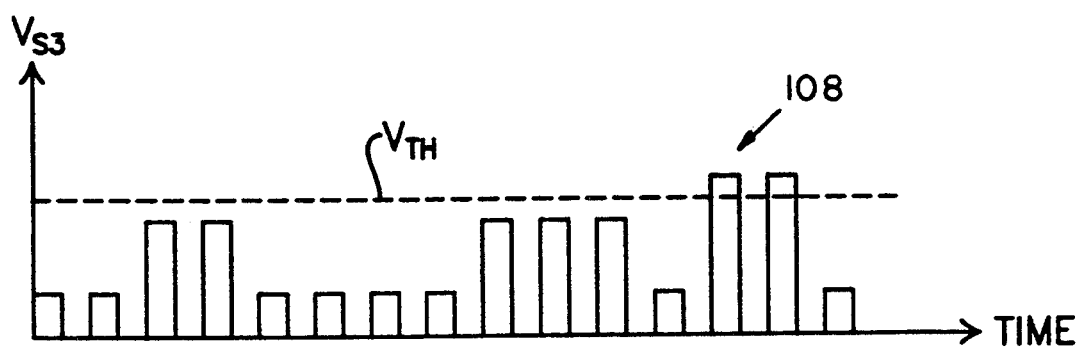

As illustrated in the lower curve 108 of FIG. 3, an interpolator circuit 48 replaces the gamma contaminated sample signals $V_{S2}$ with sample signals having amplitudes calculated as a predetermined function of adjacent, undeleted sample signals to produce sample signals $V_{S3}$. Various algorithms may be applied to perform this function within the scope of the present invention. For example, the amplitude of an inserted sample signal may be a linear interpolation between the amplitudes of the sample signals which precede and succeed the deleted sample signal respectively.

As further illustrated in the lower curve 108 of FIG. 3, high amplitude sample signals $V_{S3}$ may be processed differently from small amplitude signals in order to improve the measurement accuracy. A level sense circuit 50 compares the amplitudes of the signals $V_{S3}$ with a predetermined threshold voltage $V_{TH}$, feeds high amplitude signals to a high level processor 52 and feeds low amplitude signals to a low level processor 54. Alternatively, the level sense circuit 50 may function in the time domain by sensing whether the corresponding resets occurred at a rate higher than the Nyquist rate (high photon rate producing high amplitude sample signals) or lower than the Nyquist rate (low photon rate producing low amplitude sample signals).

The processors 52 and 54 may process the sample signals $V_{S3}$ utilizing various algorithms within the scope of the invention to produce a replica of the output signal $V_{OUT}$. The high level processor 52 preferably calculates the average slope of pairs of sample signals $V_{S3}$ generated during a Nyquist interval and multiplies the calculated slope by the Nyquist interval to produce an integral corresponding to the corresponding portion of the output signal $V_{OUT}$. At least two sample signals are required per Nyquist interval, which determines the SDR of the detector 10.

The low level processor 54 preferably adds the sample signals $V_{S3}$ generated during a Nyquist interval and multiplies the sum by the Nyquist interval. The outputs of the processors 52 and 54 are applied to a conventional signal processor 56, which receives gamma-free data samples at the Nyquist rate, and, depending upon the application, performs such functions as matched filtering and object detection. Thus, this invention provides digitized, low-noise, gamma-free data samples, as a conventional system could do, but with use of a low dynamic range readout and transmission line.

It is within the scope of the invention to perform the gamma detection and sample signal combination (Nyquist rate restoration) at the outputs of the individual SH circuits 18. However, less system power is required if the outputs of the circuits 18 are multiplexed, and these functions performed at a downstream location.

While several illustrative embodiments of the invention have been shown and described, numerous variations and alternate embodiments will occur to those skilled in the art, without departing from the spirit and scope of the invention. Accordingly, it is intended that the present invention not be limited solely to the specifically described illustrative embodiments. Various modifications are contemplated and can be made without departing from the spirit and scope of the invention as defined by the appended claims.

I claim:

1. A readout detector responsive to an electrical input signal from a photosensor, comprising:
   integrating means for integrating said input signal to produce an electrical output signal;
   sampling means for periodically sampling said output signal and producing electrical sample signals corresponding to said output signal; and
   resetting means for causing the integrating means to reset said output signal to a predetermined minimum value when the amplitude of said output signal has increased from said predetermined minimum value to a predetermined maximum value.

2. A detector as in claim 1, in which said minimum value is zero.

3. A detector as in claim 1, in which:
   the integrating means comprises an integrating capacitor; and
   the resetting means comprises means for discharging the capacitor when the amplitude of said output signal reaches said predetermined maximum value.

4. A detector as in claim 1, in which the sampling means comprises means for non-destructively sampling said output signal and producing said sample signals at a rate which is higher than the Nyquist rate of said input signal.

5. A detector as in claim 1, in which the sampling means comprises:
   means for non-destructively oversampling said output signal and producing said sample signals at a rate which is higher than the Nyquist rate of said input signal; and
   means for combining said sample signals to produce a replica of said output signal.

6. A detector as in claim 1, in which the sampling means comprises means for calculating differences between successive sample signals.

7. A detector as in claim 1, in which the sampling means further comprises gamma detector means for detecting and deleting sample signals which are determined, in accordance with a predetermined algorithm, to correspond to gamma events.

8. A detector as in claim 7, in which the gamma detector means further comprises means for replacing said deleted sample signals with signals having amplitudes calculated as a predetermined function of the amplitudes of adjacent sample signals.

9. A detector as in claim 1, further comprising:
processor means for processing said sample signals; and
multiplexer means having a plurality of inputs for receiving and multiplexing input signals applied simultaneously thereto respectively and an output connected to the processor means, the sampling means applying said sample signals to one of said inputs of the multiplexer means as said respective input signal.

10. A detector as in claim 1, in which the integrating means comprises:
an amplifier having an input and an output; and
an integrating capacitor connected between the input and output of the amplifier.

11. An integrating circuit, comprising;
integrating means for integrating an electrical input signal to produce an electrical output signal; and
resetting means for causing the integrating means to reset said output signal to a predetermined minimum value when the amplitude of said output signal has increased from said predetermined minimum value to a predetermined maximum value.

12. A circuit as in claim 11, further comprising sampling means for non-destructively sampling said output signal and producing sample signals corresponding thereto at a rate which is higher than the Nyquist rate of said input signal.

13. A circuit as in claim 11, in which:
the integrating means comprises an integrating capacitor; and
the resetting means comprises means for discharging the capacitor when the amplitude of said output signal reaches said predetermined maximum value.

14. A method of processing an electrical input signal, comprising the steps of:
(a) integrating said input signal to produce an output signal;
(b) periodically sampling said output signal and producing electrical sample signals corresponding thereto;
(c) monitoring the amplitude of said output signal; and
(d) resetting said output signal to a predetermined minimum value when said amplitude has increased from said minimum value to a predetermined maximum value.

15. A method as in claim 14, in which step (b) comprises non-destructively sampling said output signal and producing said sample signals at a rate which is higher than the Nyquist rate of said input signal.

16. A method as in claim 14, further comprising the step of:
(e) combining said sample signals to produce a replica of said output signal.

17. A method as in claim 14, in which the input signal is generated by a photosensor, the method further comprising the step of:
(e) detecting and deleting sample signals which are determined, in accordance with a predetermined algorithm, to correspond to gamma events.

18. A method as in claim 17, further comprising the step of:
(f) replacing said deleted sample signals with signals having amplitudes calculated as a predetermined function of the amplitudes of adjacent sample signals.

19. Apparatus for readout of a photosensor that is adapted to collect photons and generate a photosensor signal that is proportional to the number of photons collected, said apparatus comprising:
a least one capacitance that is charged by said photosensor signal;
detecting means for issuing a discharge signal when the voltage across said at least one capacitance has reached a threshold value;
discharging means, responsive to said discharge signal, for discharging said at least one capacitance; and
sampling means for non-destructively sampling said voltage across said at least one capacitance at a sampling rate above the Nyquist rate of said photosensor signal.

20. Apparatus as in claim 19, wherein said sampling rate approaches the maximum sampling rate of said sampling means.

21. Apparatus as in claim 19, further comprising:
gamma detector means for detecting a gamma event; and
processing means for modifying those sampled voltages that occur during a gamma event.

* * * * *